United States Patent [19]

Christy

[11] 4,439,012

[45] Mar. 27, 1984

[54] DUAL-SECONDARY MIRROR CASSEGRAIN OPTICAL SYSTEM

[75] Inventor: Orrin D. Christy, Tonawanda, N.Y.

[73] Assignee: The United States of America as represented by the Secretary of the Army, Washington, D.C.

[21] Appl. No.: 338,695

[22] Filed: Jan. 11, 1982

[51] Int. Cl.³ .............................................. G02B 23/02
[52] U.S. Cl. ...................................... 350/294; 350/299
[58] Field of Search .................... 350/294, 172, 96.33, 350/299, 442, 444; 343/755; 250/216

[56] References Cited

U.S. PATENT DOCUMENTS

| | | | |
|---|---|---|---|
| 536,759 | 4/1895 | Potter | 350/537 |
| 3,371,212 | 2/1968 | Weiss | 350/442 X |
| 3,527,526 | 9/1970 | Silvertooth | 350/294 |
| 3,614,449 | 10/1971 | Ward | 350/172 X |
| 3,781,552 | 12/1973 | Kadrmas | 250/206 |
| 3,907,408 | 9/1975 | Engel | 350/294 |
| 3,968,362 | 7/1976 | Mocker | 250/216 |
| 4,165,936 | 8/1979 | Eisenring et al. | 350/172 X |
| 4,363,533 | 12/1982 | Stowe et al. | 350/96.33 X |

Primary Examiner—John K. Corbin
Assistant Examiner—David Lewis
Attorney, Agent, or Firm—John H. Raubitschek; Werten F. W. Bellamy; Freddie M. Bush

[57] ABSTRACT

The dual-secondary mirror optical system utilizes, in principle, the Cassegrain optical system. An apertured, single, primary mirror is coaxially aligned with two secondary mirrors to provide coaxial transmit and receive optical paths. Separation of the optical paths is in radial distance from the central optical axis. An apertured secondary mirror in conjunction with the primary mirror directs the transmitted beam, providing a hollow expanded output beam. The other secondary mirror in conjunction with the primary mirror directs received radiation coaxially within and spatially separated from the hollow transmitted beam, providing dual transmit receive operation.

9 Claims, 2 Drawing Figures

DUAL-SECONDARY MIRROR CASSEGRAIN OPTICAL SYSTEM

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

Optical reflecting telescopes are used in a majority of laser radar applications. The predominant design used as the transmitter and receiver antennas is the Cassegrain system or a modified form thereof. The Cassegrain optics achieve a relatively long effective focal length on a compact optical train. Having such a short system is an advantage when rapid slewing and accurate pointing and tracking are required.

Achieving optical isolation between the transmitted laser beam and the receiver detectors is accomplished in various ways. Very often, dual apertures are used; one for the transmitter and one for the receiver. Disadvantages with this system include the increased weight penalty of the dual aperture and the difficulties which arise in mutual alignment of the two optical axes. Systems using a single transmit-receive aperture are more compact, but switching complexities between transmit and receive modes are very costly. With the single convex secondary mirror in the single transmit-receive aperture system, the transmitted laser beam must be decollimated and focused before its entrance into the optical train. Optical isolation can be achieved using an optical switch or isolator with a somewhat increased cost penalty. However, both the decollimation and isolation problems become much more serious when using a high energy laser beam. With these obstacles in mind the described invention herein achieves a simple solution to the problems.

SUMMARY OF THE INVENTION

The dual-secondary mirror Cassegrain optical system uses a single aperture-single primary mirror. The system transmits a hollow, collimated laser beam. Received optical radiation is directed by a focusing secondary mirror through an aperture in the afocal, beam expanding secondary transmitting mirror and through the aperture in the primary mirror. The received beam is coaxial with the transmitted beam and within the hollow portion of the beam. Optical isolation is provided by spatial separation of the optical paths while continuous transmit-receive operation can be provided. In addition to dual transmit-receive operation the system can be applied as a dual-field-of-view receiver or as a dual beamwidth transmitter. By using coaxial transmit and receive optical paths, only one primary mirror and two secondary mirrors are needed. Separation of the two optical paths is in radial distance from the central optical axis.

DESCRIPTION OF THE PREFERRED EMBODIMENT

Figure 1:
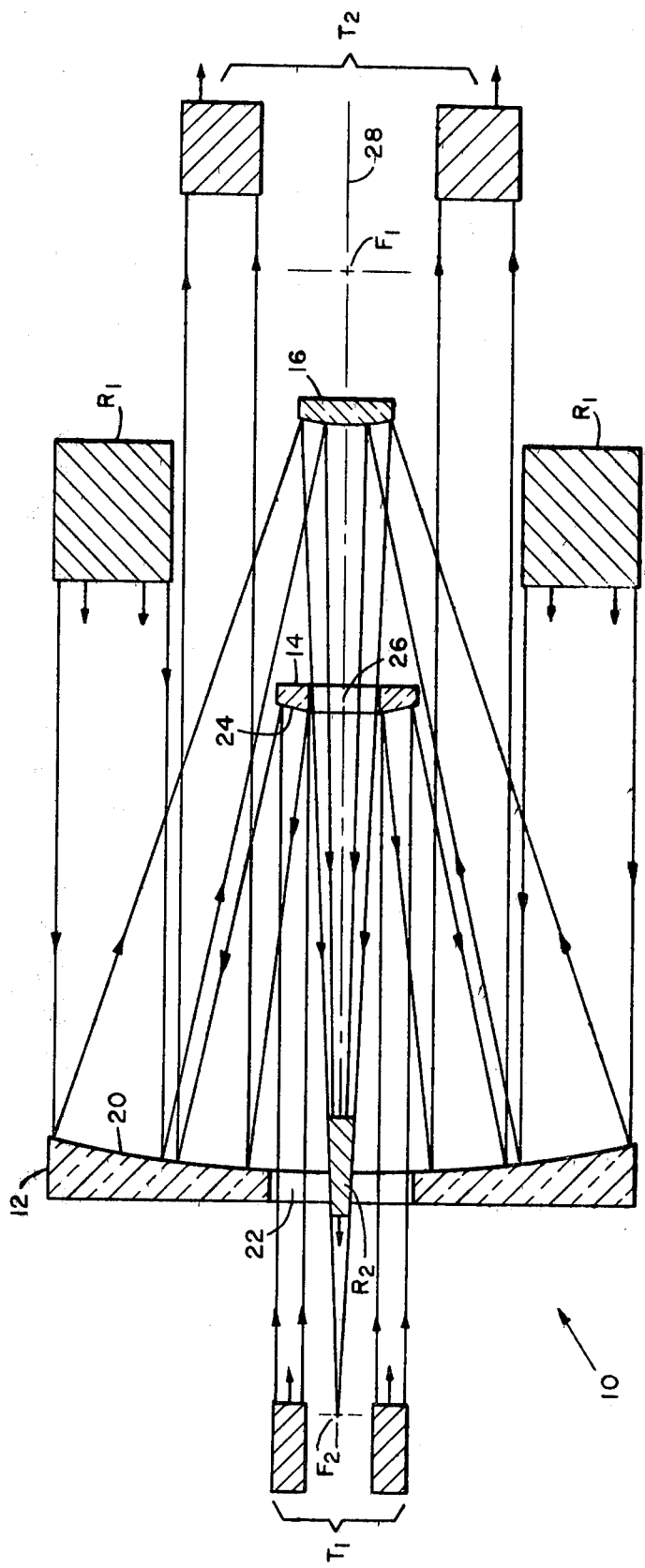
FIG. 1 is a schematic diagram of a preferred embodiment of the dual-secondary mirror Cassegrain optical system.

Referring now to the drawings wherein like numbers represent like parts, the preferred embodiment of the optical system is shown in schematic form, in cross section in FIG. 1. Support structures are well established for optical components and, as such, are not shown since they are not related to the inventive optical system. FIG. 1 discloses the dual secondary mirror Cassegrain optical system 10 to comprise a primary mirror 12, a beam expander secondary mirror 14 and a focus secondary mirror 16. Primary mirror 12 has a concave paraboloid surface 20 and an aperture 22 in the center of the mirror. Secondary mirror 14 has a convex paraboloid surface 24 with an apertured center 26 and is located between mirrors 12 and 16. Focus secondary mirror 16 is a convex hyperboloid. The optical system axis 28 is the common axis for all the mirrors.

In a transmitter-receiver configuration, an input beam T1 enters the optical train in the form of a hollow beam at the rear of mirror 12, passing through aperture 22. The intensity distribution of the beam is a palindromic Gaussian. The hollow beam T1 provides advantage in that the transmitted optical gain is increased from that of a solid beam and no power is lost by reflection from the central zone of the secondary mirror. Additionally, the hollow portion of the beam provides a separate optical path within which received optical radiation can travel. Following the transmitted beam T1 from its entrance into the system, the collimated beam impinges on secondary mirror 14 which diverges the transmitted radiation and directs the beam toward the central zone of primary mirror 12.

The convex paraboloid surface 24 of mirror 14 coupled with the central zone of primary mirror 12 forms an afocal beam expander. The focus of both mirrors 12 and 14 are coincident. From surface 20 of mirror 12, resultant expanded beam T2 exits the telescopic optics, being transmitted along axis 28 toward the object of interest or target (not shown). The palindromic Gaussian intensity distribution is maintained.

Mirror 14 can be varied in position along the axis 28. Moving mirror 14 along the optical axis can vary the amount of transmitted beam expansion. However moving mirror 14 is limited, depending on the reception interference that can be tolerated, since mirror 14 can be moved to partially obscure the received cone of rays incoming from primary mirror 12.

The receive optics of system 10 typify a basic Cassegrain optical system. Input radiation, R1, enters the telescope and impinges first on primary 12 paraboloid mirror surface 20. The wave is converged by the mirror and is focused at point F1 on axis 28, however, before reaching F1 the converging cone of radiation intercepts and is reflected from the convex hyperboloid surface of mirror 16. Mirror 16 essentially changes the rate of convergence of the cone, increases the effective focal length of the system, and focuses the converging cone, R2 at point F2 on the focal plane. The received cone of rays may then be processed for data reduction by conventional proceedures.

The received cone of rays and the transmitted beam both pass through the aperture 22 in primary mirror 12. The degree of obscuration of secondary mirror 14 against the received cone of rays R1 is not a critical factor but should be considered, since placement of mirror 14 affects both the degree of beam expansion on transmission and the degree of receiver obscuration on reception. Thus, as mirror 14 is moved toward mirror 16 the transmitted beam is expanded more but obscuration can increase. Obviously, if obscuration appears to be a problem with a particular mirror 14, a different mirror with a different paraboloid curved surface 24 can provide the enhanced beam expansion while allowing the mirror 14 to be more remotely located with respect to mirror 16.

The hollow beam and afocal transmitter beam expander provides an optical system capability to vary the amount of beam expansion and also diffraction limiting beamwidth in the far-field. In a laser radar this allows the transmitter to cover a greater field-of-view (floodlight) than the receiver will look into. The dual-secondary mirror system provides the isolation of a dual-aperture optical system but uses only a single aperture for transmit and receive. Optical isolation between transmit and receive is achieved without switching which allows this system the capacity to transmit while receiving.

Figure 2:
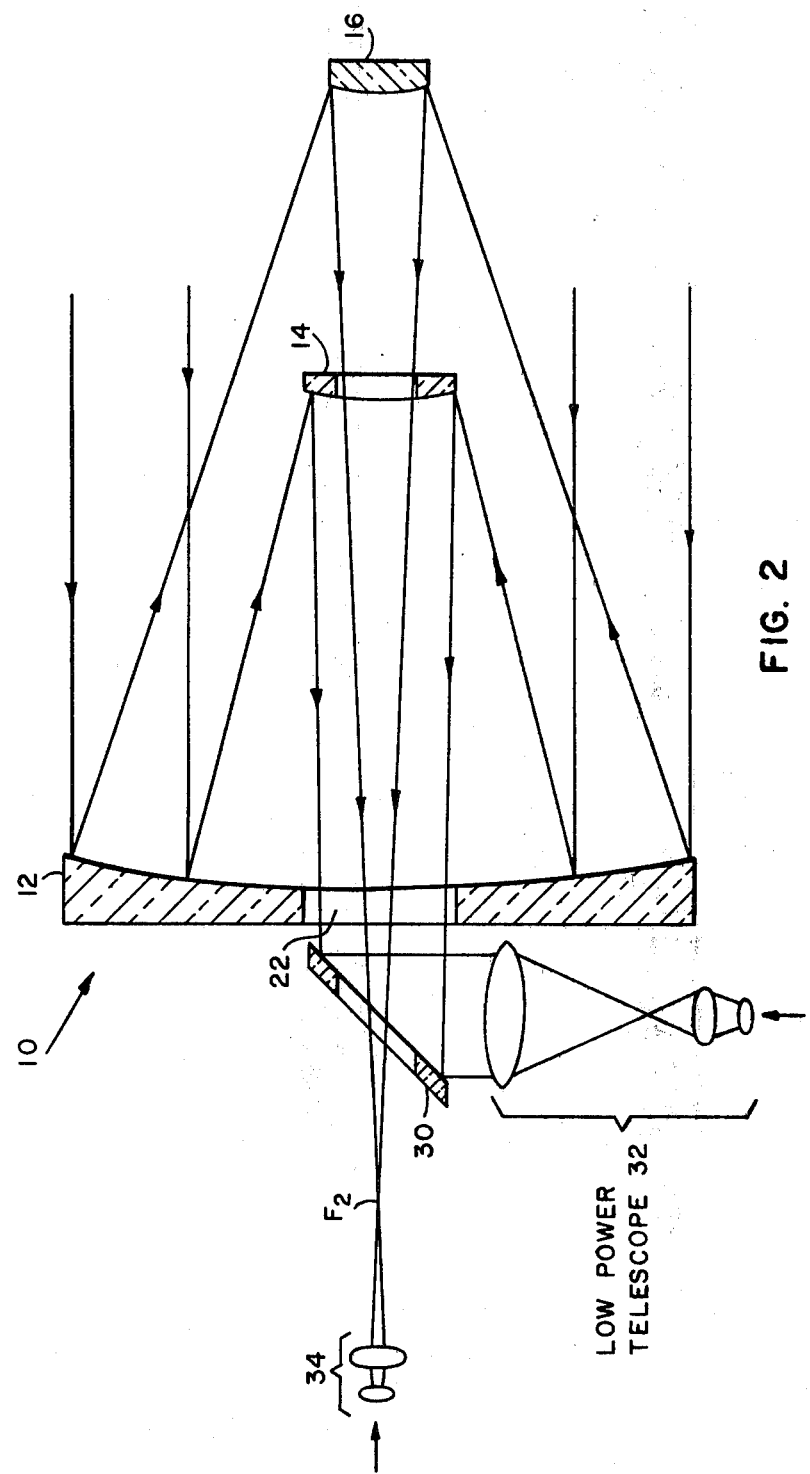
FIG. 2 is a schematic diagram of the optical system used as a dual-field-of-view receiver.

In addition to the transmitter-receiver optical configuration, the dual-mode optical system is applicable as a dual-field-of-view receiver or as a dual beamwidth transmitter. For example, as shown in FIG. 2 optical system 10 is used as a dual-receiver. Mirror 14 is positioned to receive a portion of the incoming or received optical radiation. This radiation is directed through aperture 22 of primary 12 where it is reflected from a perforated flat mirror 30 into low power telescope 32 which provides a wide field of view. The remainder of the beam is directed, as previously set forth, from mirror 16 to focal point F2 and from there to appropriate signal processing components such as an eyepiece 34 for providing a narrow field of view.

As a dual-receiver the outer hollow beam is magnified with secondary low power telescope 32. By adjusting optical system geometrics, the system now yields a dual magnification or dual-field-of-view on the same or separate focal planes. The same duality can be applied to dual-transmitters, for providing dual-laser transmitters in both coherent and semi-coherent operation to dual-PRF designator illuminators and other similar applications.

Inputs and outputs from an optical system are well established in the art and since the invention does not involve these areas, such are not disclosed. In practice, the input beam T1 can enter the rear of the optical train after being folded by a flat perforated mirror. The received cone of light R2 will pass through a central aperture of the mirror and be focused beyond the folded path of the transmitted beam. Additionally, where a coude' focus is desired a folding flat mirror in front of the primary 12, can interrupt the cone of received light R2 and redirect the focal plane.

The system is easily adapted to pointing and tracking requirements, and transmit-receive requirements for laser radar and high energy laser beam aiming and firing. It may be used in continuous transmit-receive laser rangefinder applications. In continuous transmit-receive optical communications systems, it is very practical in handling high data rates which need continuous input and output data flow. The system can provide a continuous aim-while-illuminate capability for airborne and ground designators. In astronomical telescope built-in finder scopes, by using the hollow beam from the afocal secondary, the central part of the astronomical telescope mirror can be used in conjunction with a secondary low power telescope system to give a low power, wide field spotter scope (commonly called finder scope). The normal higher powered image would be located at the other focus of the system, as shown in FIG. 2. Using the same optical primary mirror for image formation insures good alignment between finder scope and main scope. The finder scope may then be colocated inside the main optical system eliminating the need for an "attached" finder scope mounted outside the tube.

In sighting/aiming telescopes the coarse field-of-view and fine field-of-view geometries and can be combined into a single eyepiece with a coarse and fine field shutter for providing an aiming device.

Although the present invention has been described with reference to a preferred embodiment, workers skilled in the art will recognize that changes may be made in form and detail without departing from the spirit and scope of the foregoing disclosure. Accordingly, the scope of the invention should be limited only by the claims appended hereto.

I claim:

1. An optical system for transmitting and receiving optical radiation comprising: first optics means for providing a first optical beam path; and second optics means for providing a second optical beam path spatially separated from and coaxial with said first optical beam path; said first optics means comprising a primary mirror and a secondary mirror, both of said mirrors having a central aperture and being aligned coaxially for providing a common optical system axis, said secondary mirror being movably positioned along said system axis for variably expanding and reflecting optical radiation toward said primary mirror, and said primary mirror being disposed for intercepting and redirecting optical radiation received from said secondary mirror.

2. An optical system as set forth in claim 1 wherein said primary mirror and said first secondary mirror function as an afocal beam expander for receiving a hollow laser beam and transmitting an expanded hollow beam of radiation.

3. An optical system as set forth in claim 2 wherein said second optics means comprises a second secondary mirror being aligned coaxially along said common system axis; said first secondary mirror being disposed between said primary mirror and said second secondary mirror; a portion of said primary mirror being disposed for intercepting received optical radiation and redirecting said received radiation onto said second secondary mirror; said second secondary mirror being disposed for redirecting received radiation coaxially through the apertures of said primary and first secondary mirrors toward a focal plane.

4. An optical system as set forth in claim 3 wherein said primary mirror is a concave paraboloid, said first secondary mirror is a convex hyperboloid.

5. An optical system for transmitting and receiving optical radiation comprising: first optics means for providing a first optical beam path; and second optics means for providing a second optical beam path spatially separated from and coaxial with said first optical beam path; said first optics means comprising a primary mirror and a first secondary mirror aligned coaxially along a common optical axis and each having a central aperture therein for passing optical radiation therethrough; said second optics means comprising a second secondary mirror aligned coaxially along said common optical axis; said first secondary mirror being disposed coaxially between said primary mirror and said second secondary mirror; said primary mirror being disposed for intercepting received optical radiation and redirecting said received radiation onto said secondary mirrors, said first secondary mirror being disposed for intercepting an inner annulus of received radiation and redirecting it coaxially through the primary mirror aperture, said second secondary mirror being disposed for intercepting an outer annulus of the received radiation and redirecting it coaxially through the apertures of said first secondary mirror and said primary mirror, and thereby providing two separate and distinct beams of radiation.

6. An optical system as set forth in claim 5 and further comprising a focal means coaxial with said optical axis for receiving radiation from said second secondary mirror to provide a narrow field of view of the source of said radiation; a flat mirror disposed adjacent and behind said primary mirror, said flat mirror being perforated for passing radiation from said second secondary mirror to said focal means; a low power telescope for providing a wide field of view of the source of said radiation, said flat mirror being disposed for reflecting radiation from said first secondary mirror to said telescope.

7. An optical system for transmitting and receiving optical radiation comprising: first optics means for providing a first optical beam path; second optics means for providing a second optical beam path spatially separated from and coaxial with said first optical beam path; and an optical signal receiver; and wherein said first optical path is provided by a primary mirror and a first secondary mirror; said second optical path is provided by said primary mirror and a second secondary mirror; said first secondary mirror being disposed movably coaxially between the other mirrors, said mirrors having a common coaxial optical axis, said primary mirror having a central aperture therein and being disposed for receiving radiation from a distant object and redirecting the radiation to at least one of said secondary mirrors, said secondary mirrors being disposed for directing said received radiation to said optical signal receiver.

8. An optical system as set forth in claim 7 wherein said secondary mirrors are further disposed for receiving radiation coupled through said primary mirror aperture for transmission to a distant object, said secondary mirrors being disposed for directing said transmission radiation to said primary mirror for redirection toward said distant object.

9. An optical system for transmitting and receiving optical radiation comprising: first optics means for providing a first optical beam path; and second optics means for providing a second optical beam path spatially separated from and coaxial with said first optical beam path; said first optical path being provided by a first portion of said primary mirror and a first secondary mirror, said second optical path being provided by a second portion of said primary mirror and a second secondary mirror; said first secondary mirror being disposed movably between the other mirrors, all of said mirrors having a common coaxial optical axis; said primary mirror and said first secondary mirror having a central aperture, said secondary mirrors being disposed for receiving radiation coupled through said primary mirror aperture for transmission, said secondary mirrors being positioned for redirecting radiation toward said primary mirror for directing two separate and distinct beams toward said distant object, said beams being hollow and coaxial.

* * * * *